United States Patent Office 2,863,919
Patented Dec. 9, 1958

2,863,919
BIGUANIDES

Stanley Birtwell and Francis Leslie Rose, Manchester, England, assignors to Imperial Chemical Industries Limited, London, England, a corporation of Great Britain No Drawing. Application February 3, 1956
Serial No. 563,209

Claims priority, application Great Britain
February 10, 1955

9 Claims. (Cl. 260—565)

This invention relates to new biguanides and more particularly it relates to new bis-biguanides which possess antimicrobial activity and to processes for the manufacture of the said new bis-biguanides.

According to our invention we provide the new bis-biguanides which are of the formula:

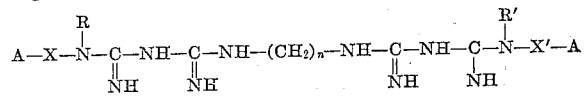

wherein A stands for a phenyl radical, which may optionally be substituted by alkyl, alkoxy or nitro groups or by halogen, wherein the two A's may be the same or different, wherein X and X', which may be the same or different, stand for an alkylene radical of not more than 3 carbon atoms, wherein R and R', which may be the same or different, stand for hydrogen or for an alkyl radical or an aralkyl radical, wherein $n$ is an integer from 2 to 12 inclusive and wherein the polymethylene chain $(CH_2)_n$ may optionally be interrupted for example by oxygen atoms and/or by aromatic nuclei, and the salts thereof.

According to a further feature of the invention we provide a process for the manufacture of the said new bis-biguanides and the salts thereof which comprises heating a bis-dicyandiamide of the formula:

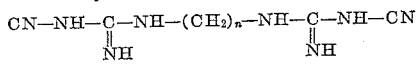

wherein $n$ has the meaning stated above with one or more amines of the formula:

A—X—NH—R wherein A, X and R have the meaning stated above, or the salts thereof.

A suitable salt of the one or more amines may be for example the hydrochloride. The reaction may be carried out in the presence of an inert diluent or solvent for example water, β-ethoxyethanol or o-dichlorobenzene and there may also be optionally present a suitable copper compound for example copper sulphate.

It is preferred to carry out the said process by heating a mixture of the bisdicyandiamide and a suitable salt of the amine for example the amine hydrochloride within the temperature range of from about 110° C. to about 160° C.

According to yet a further feature of the invention we provide another process for the manufacture of the said new bis-biguanides and the salts thereof which comprises heating a diamine of the formula:

$NH_2$—$(CH_2)_n$—$NH_2$ wherein $n$ has the meaning stated above, or a salt thereof, with a dicyandiamide of the formula:

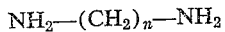

wherein A, X and R have the meaning stated above.

A suitable salt of the diamine may be for example the hydrochloride. It is preferred to carry out the said process by heating a mixture of the dicyandiamide and a suitable salt of the diamine for example the diamine hydrochloride within the temperature range of from about 110° C. to about 160° C.

The higher salts of the said new bis-biguanides for example the bis-biguanide tetrahydrochlorides may be converted into lower salts for example the bis-biguanide dihydrochloride by interaction with a suitable ion exchange resin in the presence of an inert diluent or solvent for example water. Moreover certain salts of the new bis-biguanides may be obtained by interaction of the corresponding dihydrochloride, or a mixture of the corresponding tetrahydrochloride and the requisite amount of alkali for example sodium hydroxide, with a suitable alkali metal salt for example sodium acetate in the presence of an inert diluent or solvent for example ethanol. The less soluble alkali metal salt for example sodium chloride is removed by filtration and the desired bis-biguanide salt for example the bis-biguanide acetate may be recovered from the inert diluent or solvent by any means known to the art.

As stated above, the new substances are useful as antimicrobial agents. We have found for example that they possess very high bactericidal and bacteriostatic activity when tested in vitro against gram negative organisms for example *Salmonella dublin*, *Bacterium coli* and *Pseudomonas pyocyanea* and against gram positive organisms for example *Streptococcus agalactiae* (*Streptococcus pyogenes* Kruger, *Staphylococcus aureus* and *Clostridium welchii*.

Because of their high degree of bactericidal and bacteriostatic activity the new substances are useful for many purposes, for example in medical and surgical practice for sterilization of instruments or of body tissues, as additions to wood pulp to obviate the decay consequent on the growth of fungi and bacteria, as additives to rubber latex likewise for preservative purposes, for the control of slime in paper mills and they are useful also as mothproofing agents for textiles.

The new bis-biguanides may be conveniently used in the form of the salts thereof and particularly those salts derived from the common inorganic acids for example the hydrochlorides or from the common organic acids for example the acetates. The said salts are soluble in aqueous solvents for example water. The said new bis-biguanides are not discoloured when subjected to the action of bleaching agents for example aqueous chlorine or aqueous sodium hypochlorite.

The invention is illustrated but not limited by the following examples in which parts are by weight:

*Example 1*

A mixture of 5 parts of hexamethylenebisdicyandiamide and 5.74 parts of benzylamine hydrochloride is heated at 140–150° C. for 2½ hours. It is then dissolved in 40 parts of methanol at 60° C. and the solution is cooled and there is added to it a solution of hydrogen chloride in ether until the reaction mixture is strongly acid to Congo red. More ether is added, of necessary, until precipitation is complete. It is then filtered and the residual solid is dried. 1:6-di-($N_1$:$N_1'$-benzyldiguanido-$N_5$:$N_5'$)-hexane tetrahydrochloride is obtained as a crystalline solid of M. P. 234–236° C.

*Example 2*

A mixture of 2.5 parts of hexamethylenebisdicyandiamide and 3.15 parts of β-phenylethylamine hydrochloride is heated in an oil bath, the temperature of which is 150–160° C., during 1¾ hours. The reaction product is then dissolved in ethanol, clarified with carbon and filtered and the filtrate is diluted with ether. There is thus obtained 1:6-di-($N_1$:$N_1'$-β-phenylethyldiguanido-$N_5$:$N_5'$)-hexane dihydrochloride as a colourless crystalline solid, M. P. 194–198° C.

*Example 3*

A mixture of 3.15 parts of N-methylbenzylamine hydrochloride and 2.5 parts of hexamethylenebisdicyandiamide is heated in an oil bath, the temperature of which is 150–160° C., during 1¼ hours. The reaction product is then dissolved in ethanol, clarified with carbon and filtered and the filtrate is diluted with ether. The mixture so obtained is filtered and the solid residue is then dissolved in cold ethanol, clarified with carbon and filtered and the filtrate is diluted with ether. There is thus obtained 1:6-di-($N_1$:$N_1'$-benzyl-$N_1$:$N_1'$-methyldiguanido-$N_5$:$N_5'$)-hexane dihydrochloride as a colourless crystalline solid, M. P. 169–172° C.

*Example 4*

A mixture of 1.25 parts of hexamethylenebisdicyandiamide and 2.13 parts of 3:4-dichlorobenzylaminehydrochloride is heated in an oil bath, the temperature of which is 150–160° C., during 3 hours. The reaction product is then dissolved in ethanol, clarified with carbon and filtered and the filtrate is diluted with ether. There is thus obtained 1:6-di-($N_1$:$N_1'$-3:4-dichlorobenzyldiguanido-$N_5$:$N_5'$)-hexane dihydrochloride as a colourless crystalline solid, M. P. 230–236° C.

When the 2.13 parts of 3:4-dichlorobenzylamine hydrochloride used as starting material are replaced by 1.78 parts of o-chlorobenzylamine hydrochloride and the period of heating is 40 minutes instead of 3 hours, there is obtained, in a similar manner, 1:6-di-($N_1$:$N_1'$-o-chlorobenzyldiguanido-$N_5$:$N_5'$)-hexane dihydrochloride as a colourless crystalline solid, M. P. 197–200° C., after crystallisation from water.

*Example 5*

A mixture of 1.25 parts of hexamethylenebisdicyandiamide and 2.13 parts of 2:6-dichlorobenzylamine hydrochloride is heated in an oil bath, the temperature of which is 150–160° C., during 30 minutes. The product is then dissolved in 48 parts of hot ethanol, clarified with charcoal and filtered and the filtrate is cooled and diluted with ether. The supernatant liquid is decanted from a sticky residue, further ether is added to the residue and the mixture so obtained is filtered. The solid residue is dissolved in methanol and the solution is diluted with ether to give 1:6-di-($N_1$:$N_1'$-2:6-dichlorobenzyldiguanido-$N_5$:$N_5'$)-hexane dihydrochloride as a colourless crystalline solid, M. P. 234–237° C.

*Example 6*

A mixture of 1.25 parts of hexamethylenebisdicyandiamide and 1.88 parts of β-p-methoxyphenylethylamine hydrochloride is heated in an oil bath, the temperature of which is 150–160° C., during 3 hours. The reaction product is dissolved in hot ethanol, clarified with carbon and filtered and the filtrate is diluted with ether. The supernatant liquid is decanted from an oily residue, more ether is added to the residue and the mixture so obtained is filtered. The solid residue is then dissolved in cold ethanol, clarified with carbon and filtered. The filtrate is diluted with ether and there is thus obtained 1:6-di-[$N_1$:$N_1'$ - β-(p-methoxyphenyl)ethyldiguanido-$N_5$:$N_5'$]-hexane dihydrochloride as a colourless crystalline solid, M. P. 197–200° C.

*Example 7*

A mixture of 1.25 parts of hexamethylenebisdicyandiamide and 1.72 parts of α-methyl-β-phenylethylamine hydrochloride is heated in an oil bath, the temperature of which is 150–160° C., during 2½ hours. The reaction product is dissolved in hot ethanol, clarified with carbon and filtered and the filtrate is diluted with ether and the mixture so obtained filtered. The solid residue is dissolved in cold ethanol, the solution is filtered and the filtrate is diluted with ether. The mixture is then filtered and the solid residue is crystallised from water, with clarification by the addition of carbon and there is thus obtained 1:6 - di - ($N_1$:$N_1'$ - α - methyl-β-phenylethyldiguanido-$N_5$:$N_5'$)-hexane dihydrochloride as a colourless crystalline solid, M. P. 230–232° C.

*Example 8*

A mixture of 2.5 parts of hexamethylenebisdicyandiamide and 3.77 parts of p-nitrobenzylamine hydrochloride is heated in an oil bath, the temperature of which is 150–160° C., during 3 hours. The reaction product is dissolved in hot methanol, clarified with carbon and filtered and the filtrate is diluted with ether. The supernatant liquid is decanted from an oily residue, more ether is added to the residue and the mixture so obtained is filtered. The solid residue is dissolved in cold β-ethoxyethanol, clarified with carbon and filtered and the filtrate is diluted with ether. The supernatant liquid is decanted from an oily residue, more ether is added to the residue and the mixture so obtained is filtered. The solid residue is dried at 65° C. at a pressure of 0.5 mm. of mercury and there is thus obtained 1:6-di-($N_1$:$N_1'$-p-nitrobenzyldiguanido-$N_5$:$N_5'$)-hexane dihydrochloride as a crystalline solid, M. P. 150–154° C.

*Example 9*

A mixture of 1.33 parts of di-n-propylether-ω:ω'-bisdicyandiamide and 1.44 parts of benzylamine hydrochloride is heated in an oil bath, the temperature of which is 145–150° C., during 1 hour. The reaction product is crystallised from water, with clarification by the addition of carbon, and there is thus obtained ω:ω'-di-($N_1$:$N_1'$-benzyldiguanido-$N_5$:$N_5'$)-di-n-propylether dihydrochloride as a colourless crystalline solid, M. P. 198–199° C.

*Example 10*

A mixture of 2.38 parts of di-n-propylether-ω:ω'-bisdicyandiamide and 3.18 parts of p-chlorobenzylamine hydrochloride is heated in an oil bath, the temperature of which is 150–160° C., during 3 hours. The reaction product is dissolved in water and treated with aqueous ammoniacal copper sulphate solution. The aqueous supernatant liquid is decanted from a tarry residue, aqueous dioxan is added to the residue and the mixture so obtained is filtered. The solid residue is dissolved in dilute aqueous hydrochloric acid and the solution is treated with hydrogen sulphide. The mixture so obtained is filtered and the filtrate is then evaporated to a small volume and diluted with an equal volume of concentrated aqueous hydrochloric acid. There is thus obtained ω:ω' - di - ($N_1$:$N_1'$ - p - chlorobenzyldiguanido-$N_5$:$N_5'$)-di-n-propyl ether tetrahydrochloride as a colourless crystalline solid, M. P. 223–225° C.

*Example 11*

A mixture of 2.5 parts of hexamethylenebisdicyandiamide and 3.56 parts of m-chlorobenzylamine hydrochloride is heated in an oil bath, the temperature of which is 150–160° C., during 3 hours. The reaction product is dissolved in hot water, clarified with carbon and filtered. The cooled filtrate is diluted with concentrated aqueous hydrochloric acid and there is thus obtained 1:6 - di - ($N_1$:$N_1'$ - m - chlorobenzyldiguanido-$N_5$:$N_5'$)-hexane tetrahydrochloride as a colourless crystalline solid, M. P. 218–221° C.

When the 3.56 parts of m-chlorobenzylamine hydrochloride used as starting material are replaced by 4.26 parts of 2:4-dichlorobenzylamine hydrochloride there is obtained, in a similar manner, 1:6-di-($N_1$:$N_1'$-2:4-dichlorobenzyldiguanido-$N_5$:$N_5'$)-hexane tetrahydrochloride as a colourless crystalline solid, M. P. 204–207° C.

Example 12

A mixture of 1.25 parts of hexamethylenebisdicyandiamide and 1.58 parts of p-methylbenzylamine hydrochloride is heated in an oil bath, the temperature of which is 150–160° C., during 3 hours. The reaction product is dissolved in ethanol, clarified with carbon and filtered and the filtrate is diluted with ether. The mixture so obtained is filtered and the solid residue is then crystallised twice from water with clarification by the addition of carbon. There is thus obtained 1:6-di-($N_1$:$N_1'$-p-methylbenzyldiguanido-$N_5$:$N_5'$)-hexane dihydrochloride as a colourless crystalline solid, M. P. 211–216° C.

Example 13

A mixture of 1.25 parts of hexamethylenebisdicyandiamide and 2.34 parts of dibenzylamine hydrochloride is heated in an oil bath, the temperature of which is 150–160° C., during 3 hours. The reaction product is dissolved in ethanol, clarified with carbon and filtered and the filtrate is diluted with ether. The supernatant mother liquid is decanted from an oily residue and more ether is added to the residue. The mixture so obtained is filtered and the solid residue is dissolved in the minimum of water and the solution is salted with sodium chloride. The mixture is cooled to 0–5° C. and filtered and the solid residue is washed with ice-cold aqueous sodium chloride solution and then dried under vacuum. There is thus obtained 1:6-di-($N_1$:$N_1'$-dibenzyldiguanido-$N_5$:$N_5'$)-hexane dihydrochloride dihydrate as a colourless crystalline solid.

Example 14

A mixture of 0.46 part of hexamethylenebisdicyandiamide and 0.9 part of 2:4:5-trichlorobenzylamin hydrochloride is heated in an oil bath, the temperature of which is 150–160° C., during 3 hours. The reaction product is dissolved in hot water and the solution is added to a hot solution of aqueous ammoniacal cupric chloride. The mixture is cooled and filtered and the solid residue is washed with water and then dissolved in warm dilute aqueous hydrochloric acid. The solution so obtained is treated with hydrogen sulphide and then filtered after addition of carbon. The filtrate is evaporated to dryness in vacuo and there is thus obtained 1:6 - di - ($N_1$:$N_1'$ - 2:4:5 - trichlorobenzyldiguanido-$N_5$:$N_5'$)-hexane tetrahydrochloride as a colourless crystalline solid, M. P. 207–210° C.

Example 15

A mixture of 1.25 parts of hexamethylenebisdicyandiamide and 2.06 parts of α-(p-chlorobenzyl)-ethylamine hydrochloride is heated in an oil bath, the temperature of which is 150–160° C., during 2¼ hours. The reaction product is disolved in hot ethanol, clarified with carbon and filtered and the filtrate is cooled and diluted with ether. The mixture is filtered and the solid residue is dissolved in hot ethanol, clarified with carbon and filtered. The filtrate is then cooled and diluted with ether and there is thus obtained 1:6-di-[$N_1$:$N_1'$ - α - (p - chlorobenzyl)ethyldiguanido - $N_5$:$N_5'$]-hexane dihydrochloride as a colourless crystalline solid, M. P. 202–204° C.

Example 16

A mixture of 0.7 part of m-xylene-ω:ω'-bisdicyandiamide and 0.93 part of p-chlorobenzylamine hydrochloride is heated in an oil bath, the temperature of which is 150–160° C., during 1 hour. The reaction product is crystallised from water, with clarification by the addition of carbon, and there is thus obtained ω:ω'-di-($N_1$:$N_1'$-p-chlorobenzyldiguanido-$N_5$:$N_5'$)-m-xylene dihydrochloride as a colourless crystalline solid, M. P. 200–203° C.

Example 17

A mixture of 2.09 parts of p-chlorobenzyldicyandiamide and 1.23 parts of decamethylenediamine dihydrochloride is heated in an oil bath, the temperature of which is 150–160° C., during 3 hours. The reaction product is crystallised from hot water, with clarification by the addition of carbon, and there is thus obtained 1:10 - di - ($N_1$:$N_1'$ - p - chlorobenzyldiguanido - $N_5$:$N_5'$)-decane dihydrochloride as a colourless crystalline solid, M. P. 180–182° C.

When the 1.23 parts of decamethylenediamine dihydrochloride used as starting material are replaced by 0.95 part of hexamethylenediamine dihydrochloride, there is obtained, in a similar manner, 1:6-di-($N_1$:$N_1'$-p-chlorobenzyldiguanido-$N_5$:$N_5'$)-hexane dihydrochloride as a colourless crystalline solid, M. P. 194–197° C.

When the 1.23 parts of decamethylenediamine dihydrochloride used as starting material are replaced by 1.38 parts of dodecamethylenediamine dihydrochloride and the time of reaction is 2½ hours instead of 3 hours, there is obtained, in a similar manner, 1:12-di-($N_1$:$N_1'$-p-chlorobenzyldiguanido-$N_5$:$N_5'$)-dodecane dihydrochloride as a colourless crystalline solid, M. P. 198–201° C.

Example 18

A mixture of 3.48 parts of benzyldicyandiamide and a hydrochloride, obtained by evaporation of 1.72 parts of decamethylenediamine in methanol and an excess of hydrogen chloride in methanol is heated on a steam bath during 2½ hours. The reaction product is dissolved in dilute aqueous hydrochloric acid and the solution is treated with aqueous ammoniacal cupric chloride solution. The supernatant liquid is then decanted from an oily residue and the residue is washed first with dilute aqueous sodium hydroxide solution and then twice with hot water by stirring and decantation. The oily residue is extracted with dilute aqueous hydrochloric acid and the extract is then treated with hydrogen sulphide. The mixture so obtained is filtered and the filtrate is evaporated to dryness in vacuo. There is thus obtained 1:10-di-($N_1$:$N_1'$-benzyldiguanido-$N_5$:$N_5'$)-decane tetrahydrochloride as a colourless crystalline solid, M. P. 149–155° C.

Example 19

A mixture of 1.74 parts of benzyldicyandiamide and 1.38 parts of dodecamethylenediamine dihydrochloride is heated in an oil bath, the temperature of which is 150–160° C., during 3 hours. The reaction product is dissolved in hot water, clarified with carbon and filtered and the filtrate is then cooled and diluted with concentrated aqueous hydrochloric acid. There is thus obtained 1:12-di-($N_1$:$N_1'$-benzyldiguanido-$N_5$:$N_5'$)-dodecane tetrahydrochloride as a colourless crystalline solid, M. P. 219–222° C.

Example 20

A mixture of 1.95 parts of ethylenebisdicyandiamide, 4.5 parts of benzylamine, and 25 parts by volume of a 20% w./v. aqueous solution of hydrated copper sulphate is stirred and heated under reflux in 10 parts of β-ethoxyethanol for 4½ hours. The reaction mixture is cooled and filtered, the solid residue is washed first with 50% aqueous β-ethoxyethanol and then with water. It is then stirred with dilute aqueous ammonia solution and filtered. The solid residue so obtained is suspended in boiling water and dilute aqueous hydrochloric acid is added and the mixture is then filtered hot. The filtrate is cooled and the mixture so obtained is filtered. Hydrogen sulphide is passed through the filtrate at a temperature of 60–70° C. and the mixture is filtered. The filtrate is adjusted to pH 7–8 by the addition of dilute aqueous ammonia and is then evaporated to dryness under reduced pressure. The solid residue is stirred with methanol and filtered. The filtrate is evaporated to dryness and the solid residue is crystallised from a small amount of water to give 1:6-di-($N_1$:$N_1'$-benzyldiguanido-$N_5$:$N_5'$)-ethane dihydrochloride as a colourless crystalline solid, M. P. 238–239° C.

Example 21

14.24 parts of a mixture of o- and p-chlorobenzylamine hydrochloride are stirred and heated with 10 parts of hexamethylenebisdicyandiamide in 100 parts of o-dichlorobenzene at 150° C. for 6 hours. The reaction mixture is then cooled, the supernatant liquid is decanted and the solid residue is dissolved in 100 parts of hot water. The solution is clarified by the addition of carbon and then filtered. The filtrate is cooled and diluted with concentrated aqueous hydrochloric acid and there is thus obtained a mixture, M. P., 220–240° C. comprising the hydrochlorides of the mixed 1:6-di-($N_1$:$N_1'$-chlorobenzyl-$N_5$:$N_5'$)-hexanes.

Example 22

A mixture of 35.6 parts of o-chlorobenzylamine hydrochloride, 25 parts of hexamethylenebisdicyandiamide and 15 parts of water is stirred and heated in an oil bath, the temperature of which is 145–150° C. for 17 hours. The reaction mixture is diluted with 250 parts of water and the solution so obtained is brought to the boiling point, clarified by the addition of charcoal and filtered. The filtrate is cooled and there is thus obtained 1:6-di-($N_1$:$N_1'$-o-chlorobenzyldiguanido-$N_5$:$N_5'$)-hexane dihydrochloride as a colourless crystalline solid, M. P. 197–200° C.

Example 23

A mixture of 34.6 parts of p-chlorobenzylamine hydrochloride, 24.2 parts of hexamethylenebisdicyandiamide and 14.5 parts of water are stirred and heated under reflux in an oil bath, the temperature of which is 145–150° C., during 19½ hours. The reaction mixture is then diluted with 150 parts of water, stirred during 10 minutes and then filtered. The filtrate is made strongly acid to Congo red, by the addition of concentrated aqueous hydrochloric acid, cooled during several hours and then filtered. The solid residue is washed with dilute aqueous hydrochloric acid and dried and there is thus obtained 1:6-di-($N_1$:$N_1'$-p-chlorobenzyldiguanido-$N_5$:$N_5'$)-hexane tetrahydrochloride as a colourless crystalline solid, M. P. 244–247° C.

What we claim is:

1. Bisbiguanides of the formula:

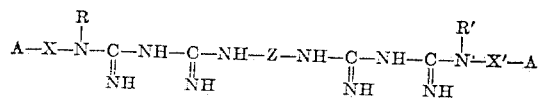

wherein the A substituents are selected from the group consisting of phenyl, alkyl phenyl, alkoxy phenyl, nitrophenyl and halophenyl; X and X' are alkylene radicals containing up to 3 carbon atoms; R and R' are selected from the group consisting of hydrogen, methyl and benzyl; and Z is selected from the group consisting of $(CH_2)_n$, $(CH_2)_n$ interrupted with oxygen and $(CH_2)_n$ interrupted with phenylene nucleus, wherein $n$ is an integer from 2 to 12, inclusive, and the salts thereof.

2. 1:6-di-($N_1$:$N_1'$-p-chlorobenzylidiguanido - $N_5$:$N_5'$)-hexane.

3. Process for the manufacture of bisguanides and the salts thereof as defined in claim 1 which comprises heating a bisdicyandiamide of the formula:

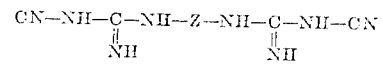

with at least one member of the group consisting of amines of the formula:

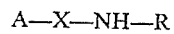

wherein Z, A, X and R have the meaning stated in claim 1 and the salts of said amines.

4. Process for the manufacture of bisguanides and the salts thereof as defined in claim 1 which comprises heating a member of the group consisting of a diamine of the formula:

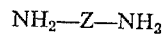

and salts thereof with a dicyandiamide of the formula:

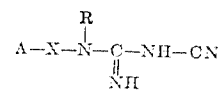

wherein Z, A, X and R have the meaning stated in claim 1.

5. Process as claimed in claim 3 wherein the amine salt is a hydrochloride.

6. Process as claimed in claim 3 wherein there is present an inert liquid medium.

7. Process as claimed in claim 3 wherein the reactants are heated within the temperature range of from about 110° C. to about 160° C.

8. Process as claimed in claim 4 wherein the salt of the diamine is a hydrochloride.

9. Process as claimed in claim 4 wherein the reactants are heated within the temperature range of from about 110° C. to about 160° C.

References Cited in the file of this patent

UNITED STATES PATENTS

| | | |
|---|---|---|
| 2,410,862 | Bousquet et al. | Nov. 12, 1946 |
| 2,455,807 | Redmon et al. | Dec. 7, 1948 |
| 2,455,896 | Nagy | Dec. 7, 1948 |
| 2,620,290 | Searle | Dec. 2, 1952 |
| 2,684,924 | Rose et al. | July 27, 1954 |
| 2,690,455 | Kaiser et al. | Sept. 28, 1954 |